(12) United States Patent
Kawamura et al.

(10) Patent No.: US 7,960,476 B2
(45) Date of Patent: Jun. 14, 2011

(54) ACRYLIC RESIN COMPOSITION

(75) Inventors: Akira Kawamura, Izumisano (JP); Ryu Takeko, Ashiya (JP); Tomo Iwata, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 720 days.

(21) Appl. No.: 11/969,839

(22) Filed: Jan. 4, 2008

(65) Prior Publication Data

US 2008/0131640 A1 Jun. 5, 2008

Related U.S. Application Data

(62) Division of application No. 11/116,277, filed on Apr. 28, 2005, now abandoned.

(30) Foreign Application Priority Data

Apr. 30, 2004 (JP) .................................. 2004-135493

(51) Int. Cl.
*C08L 31/00* (2006.01)
(52) U.S. Cl. ........ 525/163; 428/441; 428/507; 525/203; 525/204; 525/205; 525/206; 525/221; 525/222; 525/227; 525/228; 525/230
(58) Field of Classification Search .................. 525/163, 525/203–206, 221, 222, 227, 228, 230; 428/441, 428/507
See application file for complete search history.

(56) References Cited

U.S. PATENT DOCUMENTS

| | | | |
|---|---|---|---|
| 4,337,325 A | 6/1982 | Shah | |
| 5,648,166 A * | 7/1997 | Dunshee | ................. 428/355 AC |
| 2003/0170195 A1 | 9/2003 | Houze et al. | |
| 2005/0065252 A1 | 3/2005 | Kawamura et al. | |

FOREIGN PATENT DOCUMENTS

JP 5-107410 A 4/1993

OTHER PUBLICATIONS

Shah et al., J. Adhesion Sci. Tech., vol. 1, No. 2, pp. 159-164 (1987).

* cited by examiner

*Primary Examiner* — Edward J Cain
(74) *Attorney, Agent, or Firm* — Birch, Stewart, Kolasch & Birch, LLP

(57) ABSTRACT

An acrylic resin composition containing the following acrylic resins (1) and (2):

an acrylic resin (1) containing a structural unit (a) derived from a monomer (a) and a structural unit (b) derived from a monomer (b);

an acrylic resin (2) having a molecular weight of 1,100,000 to 1,500,000, and containing the structural unit (a) as the main component and a structural unit (c) derived from a monomer (c) and substantially not containing the structural unit (b);

(a): a (meth)acrylate of the formula (A)

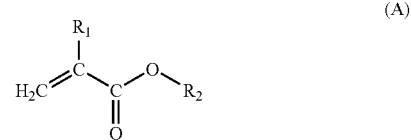

(A)

(wherein, $R_1$ and $R_2$ are defined in the specification), (b): a monomer containing an olefinic double bond and at least one 5- or more-membered heterocyclic group in the molecule, (c): a monomer not containing 5- or more-membered heterocyclic group and containing one olefinic double bond and at least one polar functional group which is a carboxyl, hydroxyl, amide, amino, epoxy, oxetanyl, aldehyde or isocyanate group in the molecule.

6 Claims, No Drawings

ACRYLIC RESIN COMPOSITION

This application is a divisional of application Ser. No. 11/116,277, filed on Apr. 28, 2005, now abandoned the entire contents of which are hereby incorporated by reference and for which priority is claimed under 35 U.S.C. §120.

TECHNICAL FIELD OF THE INVENTION

The present invention relates to an acrylic resin composition.

BACKGROUND OF THE INVENTION

Liquid crystal cells generally used in liquid crystal displays such as a TN liquid crystal cell (TFT), a STN liquid crystal cell (STN) and the like, have a structure in which a liquid crystal component is sandwiched between two glass base materials. On the surface of the glass base material, an optical film such as a polarizing film, phase retardation film and the like is laminated via an adhesive composed mainly of an acrylic resin. An optical laminate composed of a glass base material, adhesive and optical film laminated in this order is in general produced by a method in which first an optical laminated film having an adhesive layer composed of an adhesive is laminated on an optical film is obtained, and then, a glass base material is laminated on the surface of the adhesive layer.

Such an optical laminated film tends to generate curl and the like due to large dimension change by expansion and shrinkage under heating or moistening and heating conditions, consequently, there are problems such as occurrence of foaming in an adhesive layer of the resulted optical laminate, generation of peeling between an adhesive layer and a glass base material, and the like. Under heating or moistening and heating conditions, distribution of remaining stress acting on an optical laminated film becomes non-uniform, concentration of stress occurs around peripheral parts of an optical laminate, consequently, there is a problem that light leakage occurs in a TN liquid crystal cell (TFT). For solving such problems, there is a suggestion on an adhesive mainly composed of an acrylic resin having a structural unit derived from N-vinylpyrrolidone which is a kind of monomer having a hetero-cycle in the molecule (Japanese Patent Application Laid-Open (JP-A) No. 5-107410).

However, there is a problem that, when a liquid crystal cell obtained by using an optical laminate having an adhesive layer made of an adhesive mainly composed of an acrylic resin having a structural unit derived from N-vinylpyrrolidone is preserved under moistening and heating conditions, light leakage occurs and durability becomes worse.

DISCLOSURE OF THE INVENTION

An object of the present invention is to provide an acrylic resin composition capable of producing an optical laminated film used in a liquid crystal cell in which light leakage is suppressed and durability is improved.

The present inventors have intensively studied to find an acrylic resin composition capable of solving problems as described above, and resultantly found that a liquid crystal cell obtained by using an acrylic resin composition comprising an acrylic resin containing a structural unit derived from heterocyclic group in the molecule and an acrylic resin having high molecular weight and not containing a structural unit derived from heterocyclic group in the molecule shows little light leakage and improved durability, and have completed the present invention.

Namely, the present invention provides the following [1] to [14].

[1] An acrylic resin composition comprising the following acrylic resins (1) and (2):

acrylic resin (1): an acrylic resin containing a structural unit derived from a monomer (a) (structural unit (a)) and a structural unit derived from a monomer (b) (structural unit (b));

acrylic resin (2): an acrylic resin having a molecular weight of 1,100,000 to 1,500,000, and containing the structural unit (a) as the main component and a structural unit derived from a monomer (c) (structural unit (c)) and substantially not containing structural unit (b);

(a): a (meth)acrylate of the formula (A)

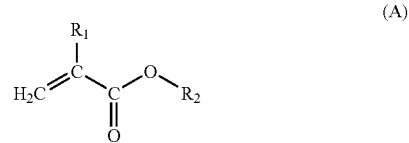

(A)

(wherein, $R_1$ represents a hydrogen atom or methyl group, $R_2$ represents an alkyl group having 1 to 14 carbon atoms or an aralkyl group having 1 to 14 carbon atoms, and a hydrogen atom in the alkyl group $R_2$ or a hydrogen atom in the aralkyl group $R_2$ may be substituted with an alkoxy group having 1 to 10 carbon atoms.), (b): a monomer containing an olefinic double bond in the molecule and at least one 5- or more-membered heterocyclic group in the molecule, (c): a monomer not containing 5- or more-membered heterocyclic group and containing one olefinic double bond and at least one polar functional group selected from the group consisting of a carboxyl group, hydroxyl group, amide group, amino group, epoxy group, oxetanyl group, aldehyde group and isocyanate group in the molecule.

[2] The composition according to [1], wherein the content of the structural unit (a) in the acrylic resin (1) is from 60 to 99.9 parts by weight based on 100 parts by weight of the acrylic resin (1).

[3] The composition according to [1] or [2], wherein the content of the structural unit (b) in the acrylic resin (1) is from 0.1 to 40 parts by weight based on 100 parts by weight of the acrylic resin (1).

[4] The composition according to any one of [1] to [3], wherein the monomer (b) is N-vinylpyrrolidone and/or vinylcaprolactam.

[5] The composition according to any one of [1] to [4], wherein the acrylic resin (1) is an acrylic resin further containing the structural unit (c).

[6] The composition according to any one of [1] to [5], wherein the amount of the acrylic resin (1) is 1 to 50 parts by weight based on 100 parts by weight of the total amount of the acrylic resin (1) and the acrylic resin (2).

[7] An adhesive comprising the composition according to any one of [1] to [6] and a cross-linking agent and/or silane-based compound.

[8] An optical laminated film laminating an adhesive layer composed of the adhesive according to [7] on both surfaces or one surface of an optical film.

[9] The optical laminated film according to [8], wherein the optical film is a polarizing film and/or phase retardation film.

[10] The optical laminated film according to [8] or [9], wherein the optical film is an optical film further having an acetylcellulose-based film as a release film.

[11] The optical laminated film according to any one of [8] to [10], wherein a release film is further laminated on the adhesive layer of the optical laminated film.

[12] An optical laminate obtained by laminating a glass base material on the adhesive layer of the optical laminated film according to any one of [8] to [10].

[13] An optical laminate obtained by peeling the release film from the optical laminated film according to [11], then, laminating a glass base material on the adhesive layer of the optical laminated film.

[14] An optical laminate obtained by peeling the optical laminated film from the optical laminate according to [12] or [13], then, laminating again the optical laminated film on the resulted glass base material.

The present invention will be described in detail below.

The monomer (a) used in the acrylic resin (1) and the acrylic resin (2) is a (meth)acrylate of the following formula (A):

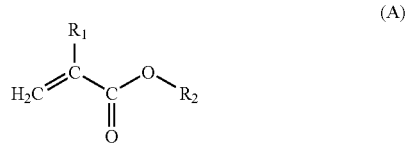

In the formula, $R_1$ represents a hydrogen atom or methyl group, $R_2$ represents an alkyl group having 1 to 14 carbon atoms or an aralkyl group having 1 to 14 carbon atoms. A hydrogen atom in the alkyl group $R_2$ or a hydrogen atom in the aralkyl group $R_2$ may be substituted with an alkoxy group having 1 to 10 carbon atoms.

Examples of the alkyl group having 1 to 14 carbon atoms include a methyl group, ethyl group, butyl group, octyl group, and the like.

Examples of the aralkyl group having 1 to 14 carbon atoms include a benzyl group, and the like. The aralkyl group having 7 to 14 carbon atoms is preferably used.

Examples of the alkoxy group having 1 to 10 carbon atoms include a methoxy group, ethoxy group, butoxy group and the like.

Examples of the monomer (a) include acrylates such as methyl acrylate, ethyl acrylate, propyl acrylate, n-butyl acrylate, iso-butyl acrylate, 2-ethylhexyl acrylate, n-octyl acrylate, iso-octyl acrylate, lauryl acrylate, stearyl acrylate, cyclohexyl acrylate, isobornyl acrylate, benzyl acrylate, methoxyethyl acrylate, ethoxylmethyl acrylate and the like; and
methacrylates such as methyl methacrylate, ethyl methacrylate, propyl methacrylate, n-butyl methacrylate, iso-butyl methacrylate, 2-ethylhexyl methacrylate, n-octyl methacrylate, iso-octyl methacrylate, lauryl methacrylate, stearyl methacrylate, cyclohexyl methacrylate, isobornyl methacrylate, benzyl methacrylate, methoxyethyl methacrylate, ethoxymethyl methacrylate and the like.

The monomer (a) may be used alone or in admixture of two or more.

The content of a structural unit derived from the monomer (a) (structural unit (a)) in the acrylic resin (1) is usually from approximately 60 to 99.9 parts by weight, and preferably from approximately 70 to 95 parts by weight based on 100 parts by weight of the acrylic resin (1).

The content of a structural unit derived from the monomer (a) (structural unit (a)) in the acrylic resin (2) is usually from approximately 70 to 99.9 parts by weight, and preferably from approximately 80 to 99.6 parts by weight based on 100 parts by weight of the acrylic resin (2).

The monomer (b) is a monomer containing one olefinic double bond in the molecule and at least one 5- or more-membered heterocyclic group in the molecule.

The monomer (b) has heterocyclic group in which a carbon atom of at least one methylene group in an alicyclic hydrocarbon group having 5 or more carbon atoms, preferably 5 to 7 carbon atoms is substituted with a hetero atom such as a nitrogen atom, oxygen atom or sulfur atom.

Specific examples of the monomer (b) include acryloylmorpholine, vinylcaprolactam, N-vinyl-2-pyrrolidone, tetrahydrofurfuryl acrylate, tetrahydrofurfuryl methacrylate, caprolactone-modified tetrahydrofurfuryl acrylate, and the like.

A monomer having 7-membered heterocyclic group such as 3,4-epoxycyclohexyl methyl acrylate, 3,4-epoxycyclohexyl methyl methacrylate can be used as the monomer (b).

Monomers having an olefinic double bond contained in a heterocyclic group, such as 2,5-dihydrofuran and the like are included in the monomer (b).

The monomer (b) may be used alone or in combination of two or more.

As the monomer (b), N-vinylpyrrolidone, vinylcaprolactam, acryloylmorpholine, or mixtures thereof are suitably used, N-vinylpyrrolidone, vinylcaprolactam are more suitably used.

The content of a structural unit derived from the monomer (b) (structural unit (b)) contained in the acrylic resin (1) is usually from approximately 0.1 to 40 parts by weight, and preferably from approximately 0.1 to 30 parts by weight based on 100 parts by weight of the acrylic resin (1). When the content of the structural unit (b) is 0.1 part by weight or more, even if the dimension of an optical film changes, an adhesive layer varies following this dimension change, consequently, a difference between brightness of peripheral parts of a liquid crystal cell and brightness of central parts becomes smaller, and light leakage and non-uniformity of color tend to be suppressed preferably, and when 40 parts by weight or less, peeling between a glass base material and an adhesive layer tends to be suppressed preferably.

The structural unit (structural unit (c)) derived from the monomer (c) is the essential component of the acrylic resin (2) and may contain in acrylic resin (1) as an arbitrary component.

Here, the monomer (c) is a monomer not containing 5- or more-membered heterocyclic group, and containing one olefinic double bond and a polar functional group such as a carboxyl group, hydroxyl group, amino group, amide group, epoxy group, oxetanyl group, aldehyde group, isocyanate group or the like in the molecule.

Specific examples of the monomer (c) include monomers in which a polar functional group is a carboxyl group such as acrylic acid, methacrylic acid, maleic acid, itaconic acid and the like;
monomers in which a polar functional group is a hydroxyl group such as 2-hydroxyethyl (meth)acrylate, 2-hydroxypropyl (meth)acrylate, 4-hydroxybutyl (meth)acrylate and the like;
monomers in which a polar functional group is an amide group such as acrylamide, methacrylamide, N,N-dimethylaminopropylacrylamide, diacetonediamide, N,N-dimethylacrylamide, N,N-diethylacrylamide, N-methylolacrylamide and the like;
monomers in which a polar functional group is an amino group such as N,N-dimethylaminoethyl acrylate, allylamine and the like;

monomers in which a polar functional group is an epoxy group such as glycidyl acrylate, glycidyl methacrylate and the like;

monomers in which a polar functional group is an oxetany group such as oxetanyl (meth)acrylate, 3-oxetanylmethyl (meth)acrylate, (3-methyl-3-oxetanyl)methyl (meth)acrylate, (3-ethyl-3-oxetanyl)methyl (meth)acrylate and the like;

monomers in which a polar functional group is an aldehyde group such as acrylaldehyde and the like;

monomers in which a polar functional group is an isocyanate group such as 2-methacryloyloxyethyl isocyanate and the like.

The monomer (c) may be used alone or in combination of two or more.

The content of the structural unit (c) in the acrylic resin (2) is usually from approximately 0.05 to 20 parts by weight, preferably from approximately 0.3 to 10 parts by weight based on 100 parts by weight of the acrylic resin (2). When the content of the structural unit (c) is 0.05 parts by weight or more, the cohesive force of the resulting resin tends to increase preferably, and when 20 parts by weigh or less, floating and peeling between a glass base plate and an adhesive layer tends to be suppressed preferably.

When the acrylic resin (1) contains the monomer (c), the content of the structural unit (c) in the acrylic resin (1) is usually from approximately 0 to 20 parts by weight based on 100 parts by weight of the acrylic resin (1). When the content of the structural unit (c) is 20 parts by weight or less, floating and peeling between a glass base plate and an adhesive layer tends to be suppressed preferably.

As the monomer (c), acrylic acid, 4-hydroxybutyl (meth)acrylate are suitably used.

In producing the acrylic resin (1) and the acrylic resin (2) of the present invention, a monomer (d) different from the monomers (a) to (c) may be polymerized with the monomers (a) to (c).

Here, the monomer (d) is a monomer containing one olefinic double bond and at least one alicyclic structure in the molecule. This alicyclic structure is usually a cycloparaffin structure or cycloolefin structure having 5 or more carbon atoms, preferably approximately 5 to 7 carbon atoms, and in the cycloolefin structure, an olefinic double bond is contained in the alicyclic structure.

Examples of the monomer (d) include the acrylate having an alicyclic structure such as isobornyl acrylate, cyclohexyl acrylate, dicyclopentanyl acrylate, cyclododecyl acrylate, methylcyclohexyl acrylate, trimethylcyclohexyl acrylate, tert-butylcyclohexyl acrylate, cyclohexyl-α-ethoxy acrylate, cyclohexyl phenyl acrylate and the like;

methacrylate having an alicyclic structure such as isobornyl methacrylate, cyclohexyl methacrylate, dicyclopentanyl methacrylate, cyclododecyl methacrylate, methylcyclohexyl methacrylate, trimethylcyclohexyl methacrylate, tert-butylcyclohexyl methacrylate, cyclohexyl-α-ethoxy methacrylate, cyclohexyl phenyl methacrylate and the like.

Examples of the monomer (d) include the acrylate having a plurality of alicyclic structures such as biscyclohexyl methyl itaconate, dicyclooctyl itaconate, dicyclododecyl methyl succinate and the like. As the monomer (d), vinyl cyclohexyl acetate containing vinyl group, and the like can be used.

The monomer (d) may be used alone or in combination of two or more.

When the monomer (d) is used in the acrylic resin (1), the content of the structural unit (d) contained in the acrylic resin (1) is usually from approximately 0.1 to 30 parts by weight, preferably from approximately 1 to 15 parts by weight based on 100 parts by weight of the acrylic resin (1). When the content of the structural unit (d) is 0.1 part by weight or more, floating and peeling between a glass base plate and an adhesive layer tends to be suppressed preferably, and when 30 parts by weight or less, even if the dimension of an optical film changes, an adhesive layer varies following this dimension change, consequently, a difference between brightness of peripheral parts of a liquid crystal cell and brightness of central parts becomes smaller, and light leakage and non-uniformity of color tend to be suppressed preferably.

As the monomer (d), isobornyl acrylate, cyclohexyl acrylate, isobornyl methacrylate, cyclohexyl methacrylate and dicyclopentanyl acrylate are preferable due to easy availability.

In producing the acrylic resin (1) and the acrylic resin (2) used in the present invention, a vinyl-based monomer (e) different from the monomers (a) to (d) may be polymerized with the monomers (a) to (d).

Examples of the vinyl-based monomer include fatty vinyl esters, halogenated vinyls, halogenated vinylidenes, aromatic vinyls, (meth)acrylonitrile, conjugated diene compounds and the like.

Examples of the fatty vinyl ester include vinyl acetate, vinyl propionate, vinyl butyrate, vinyl 2-ethylhexanoate, vinyl laurate and the like.

Examples of the halogenated vinyl include vinyl chloride, vinyl bromide and the like.

Examples of the halogenated vinylidene include vinylidene chloride and the like.

The aromatic vinyl is a compound having a vinyl group and an aromatic group, and specific examples thereof include styrene-based monomers such as styrene, methylstyrene, dimethylstyrene, trimethylstyrene, ethylstyrene, diethylstyrene, triethylstyrene, propylstyrene, butylstyrene, hexylstyrene, heptylstyrene, octylstyrene, fluorostyrene, chlorostyrene, bromostyrene, dibromostyrene, iodostyrene, nitrostyrene, acetylstyrene, methoxystyrene and the like, nitrogen-containing aromatic vinyls such as vinylpyridine, vinyl carbazole and the like.

Examples of the (meth)acrylonitrile include acrylonitril, methacrylonitrile and the like.

The conjugated diene compound is an olefine having a conjugated double bond in the molecule, and specific examples thereof include isoprene, butadiene, chloroprene and the like.

The vinyl-based monomer (e) may be used alone or in combination of two or more.

The content of the structural unit (e) derived from the monomer (e) contained in the acrylic resin (1) is usually 5 parts by weight or less, preferably 0.05 parts by weight or less based on 100 parts by weight of all structural units constituting the acrylic resin (1), and it is more preferable that the structural unit (e) is not substantially contained.

The content of the structural unit (e) contained in the acrylic resin (2) is usually 5 parts by weight or less, preferably 0.05 parts by weight or less based on 100 parts by weight of all structural units constituting the acrylic resin (2), and it is more preferable that the structural unit (e) is not substantially contained.

As the method of producing the acrylic resin (1) and (2) used in the present invention, for example, a solution polymerization method, emulsion polymerization method, block polymerization method, suspension polymerization method and the like are listed. In production of an acrylic resin, a polymerization initiator is usually used. The polymerization initiator is usually used in an amount of approximately 0.001 to 5 parts by weight based on 100 parts by weight of all monomers used in production of an acrylic resin.

As the polymerization initiator, for example, a heat-polymerization initiator, photo-polymerization initiator, and the like are listed.

Examples of the heat-polymerization initiator include azo-based compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaletonitrile), dimethyl-2,2'-azobis(2-methyl propionate), 2,2'-azobis(2-hydroxymethylpropionitrile) and the like;
organic peroxides such as lauryl peroxide, tert-butyl hydroperoxide, benzoyl peroxide, tert-butyl peroxybenzoate, cumene hydroperoxide, diisopropyl peroxy dicarbonate, di-n-propyl peroxydicarbonate, tert-butyl peroxyneodecanoate, tert-butyl peroxypivalate, (3,5,5-trimethylhexanonyl) peroxide and the like;
inorganic peroxides such as potassium persulfate, ammonium persulfate, hydrogen peroxide and the like.

Examples of the photo-polymerization initiator include 4-(2-hydroxyethoxy)phenyl(2-hydroxy-2-propyl)ketone and the like.

Redox-based initiators using a heat-polymerization initiator and a reducing agent together can also be used as a polymerization initiator.

As the method of producing an acrylic resin, a solution polymerization method is preferable.

Specifically mentioned as the solution polymerization method are a method in which given monomers and an organic solvent are mixed, a heat-polymerization initiator is added under a nitrogen atmosphere, and the mixture is stirred for approximately 3 to 10 hours at approximately 40 to 90° C., preferably approximately 60 to 80° C., and other methods. For controlling the reaction, a method in which monomers and a heat-polymerization initiator used are added during polymerization, a method in which these are dissolved in an organic solvent before addition thereof, and the like may be adopted.

Here, examples of the organic solvent include aromatic hydrocarbons such as toluene, xylene and the like; esters such as ethyl acetate, butyl acetate and the like; aliphatic alcohols such as n-propyl alcohol, isopropyl alcohol and the like; ketones such as methyl ethyl ketone, methyl isobutyl ketone and the like.

The weight-average molecular weight based on polystyrene calibration standard of gel permeation chromatography (GPC) of the acrylic resin (1) is usually $1 \times 10^4$-$150 \times 10^4$. When the weight-average molecular weight is $1 \times 10^4$ or more, adhesion under high temperature and high humidity increases, and floating and peeling between a glass base plate and an adhesive layer tends to lower, further, a re-working property tends to be improved, preferably. When the weight-average molecular weight is $150 \times 10^4$ or less, even if the dimension of an optical film changes, an adhesive layer varies following this dimension change, consequently, a difference between brightness of peripheral parts of a liquid crystal cell and brightness of central parts becomes smaller, and light leakage and non-uniformity of color tend to be suppressed preferably.

The weight-average molecular weight based on polystyrene calibration standard of gel permeation chromatography (GPC) of the acrylic resin (2) is usually $110 \times 10^4$-$150 \times 10^4$. When the weight-average molecular weight is $110 \times 10^4$ or more, adhesion under high temperature and high humidity increases, and floating and peeling between a glass base plate and an adhesive layer tends to lower, further, a re-working property tends to be improved, preferably. When the weight-average molecular weight is $150 \times 10^4$ or less, even if the dimension of an optical film changes, an adhesive layer varies following this dimension change, consequently, a difference between brightness of peripheral parts of a liquid crystal cell and brightness of central parts becomes smaller, and light leakage and non-uniformity of color tend to be suppressed preferably.

The acrylic resin composition of the present invention is a resin composition containing acrylic resin (1) and acrylic resin (2).

Regarding production thereof, usually, an acrylic resin (1) and acrylic resin (2) are separately produced, and then, mixed, or, it may also be permissible that either an acrylic resin (1) or acrylic resin (2) is produced, then, another acrylic resin is produced in the presence of the produced acrylic resin. Further, it may also be permissible that acrylic resins (1) and (2) are mixed, and then, diluted with an organic solvent.

Regarding the weight ratio (non-volatile component) in an acrylic resin composition, the ratio of the acrylic resin (1) is usually 1-50 parts by weight, preferably approximately 3 to 40 parts by weight based on 100 parts by weight of the total amount of the acrylic resin (1) and acrylic resin (2). When the ratio of the acrylic resin (1) is 1 part by weight or more, even if the dimension of an optical film changes, an adhesive layer varies following this dimension change, consequently, a difference between brightness of peripheral parts of a liquid crystal cell and brightness of central parts becomes smaller, and light leakage and non-uniformity of color tend to be suppressed preferably. When the ratio of the acrylic resin (1) is 50 parts by weight or less, adhesion under high temperature and high humidity increases, and floating and peeling between a glass base plate and an adhesive layer tends to lower, further, a re-working property tends to be improved, preferably.

The acrylic resin composition of the present invention can be used as it is for an adhesive, paint, thickening agent and the like.

A composition obtained by compounding a cross-linking agent and/or silane-based compound in the acrylic resin composition of the present invention is suitable as an adhesive.

Here, the cross-linking agent has in the molecule two or more functional groups capable of cross-linking with a polar functional group, and specific examples thereof include isocyanate-based compounds, epoxy-based compounds, metal chelate-based compounds, aziridine-based compounds and the like.

Here, examples of the isocyanate-based compound include tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethylxylylene diisocyanate, naphthalene diisocyanate, triphenylmethane triisocyanate, polymethylene polyphenyl isocyanate and the like, and adducts obtained by reacting polyols such as glycerol, trimethylolpropane and the like with the above-mentioned isocyanate compounds, and those obtained by converting the isocyanate compounds into dimmers, trimers and the like, are also included.

Examples of the epoxy-based compound include bisphenol A type epoxy resin, ethylene glycol glycidyl ether, polyethylene glycol diglycidyl ether, glycerine glycidyl ether, glycerine triglycidyl ether, 1,6-hexanediol diglycidyl ether, trimethylolpropane triglycidyl ether, diglycidylaniline, N,N,N',N'-tetraglycidyl-m-xylenediamine, 1,3-bis(N,N'-diglycidylaminomethyl)cyclohexane and the like.

Examples of the metal chelate compound include compounds obtained by coordinating acetylacetone or ethyl acetoacetate on poly-valent metals such as aluminum, iron, copper, zinc, tin, titanium, nickel, antimony, magnesium, vanadium, chromium, zirconium and the like.

Examples of the aziridine-based compound include N,N'-diphenylmethane-4,4'-bis(1-aziridine carboxide), N,N'-toluene-2,4-bis(1-aziridine carboxamide), triethylenemelamine, bisisophthaloyl-1-(2-methylaziridine), tri-1-aziridinylphosphine oxide, N,N'-hexamethylene-1,6-bis(1-aziridine carboxide), trimethylolpropane-tri-β-aziridinyl propionate, tetramethylolmethane-tri-β-aziridinyl propionate, and the like.

The cross-linking agent may be used alone or in combination of two or more. The use amount of a cross-linking agent (non-volatile component) in an adhesive is usually from approximately 0.005 to 5 parts by weight, preferably from approximately 0.01 to 3 parts by weight based on 100 parts by weight of an acrylic resin (non-volatile component). When the amount of the cross-linking agent is 0.005 parts by weight or more, floating and peeling between a glass base plate and an adhesive layer and a re-working property tend to be improved preferably, and when 5 parts by weight or less, a property of an adhesive layer to follow the dimension change of an optical film is excellent, consequently, light leakage and non-uniformity of color tend to lower preferably.

Examples of the silane-based compound used in the adhesive of the present invention include vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane, 3-mercaptopropyltrimethoxysilane and the like. In the adhesive of the present invention, two or more silane-based compounds may be used.

The use amount of the silane-based compound (solution) is usually from approximately 0.0001 to 10 parts by weight, preferably from 0.01 to 5 parts by weight based on 100 parts by weight of an acrylic resin (non-volatile component). When the amount of a silane-based compound is 0.0001 part by weight or more, adhesion between an adhesive layer and a glass base plate is improved preferably. When the amount of a silane-based compound is 10 parts by weight or less, bleeding out of a silane-based compound from the adhesive layer tends to be suppressed preferably.

The adhesive of the present invention is composed of an acrylic resin, cross-linking agent and/or silane-based compound as described above, and, a weather-resistant agent, tackifier, plasticizer, softening agent, dye, pigment, inorganic filler and the like may be further compounded to the adhesive of the present invention.

The optical laminated film can be produced in comparatively short time by compounding a cross-linking catalyst together with a cross-linking agent to the adhesive. In the optical laminate containing the optical laminated film, floating and peeling between an optical film and an adhesive layer and foaming in the adhesive layer tend to lower, further, a re-working property tends to be improved, preferably.

Examples of the cross-linking catalyst include amine-based compound such as hexamethylenediamine, ethylenediamine, polyethyleneimine, hexamethylenetetramine, diethylenetriamine, triethylenetetramine, isophoronediamine, triethylenediamine, polyamino resin, melamine resin, and the like. When using the amine-based compound as the cross-linking catalyst in the adhesive, the isocyanate-based compound is preferably used as the cross-linking agent.

The optical laminated film of the present invention is obtained by laminating an adhesive layer composed of the above-mentioned adhesive on an optical film.

As the method for producing an optical laminated film, there are listed, for example, a method in which an adhesive diluted with an organic solvent is applied on a release film, and usually heated at 60-120° C. for approximately 0.5-10 minutes to distill off the organic solvent to obtain the adhesive layer. Subsequently, an optical film is further laminated on the resulted adhesive layer, then, aged under a temperature of 23° C. and a humidity of 65% for 5-20 days, after a cross-linking agent is fully reacted, the release film is peeled to obtain an optical laminated film;

a method in which the adhesive layer is obtained as the same manner in the above-mentioned method, two layer laminate composed of the resulted adhesive layer and a release film is combined so that the adhesive layer and the release film are layered alternatively to obtain a multi-layer laminate, then, aged under a temperature of 23° C. and a humidity of 65% for 5-20 days, after a cross-linking agent is fully reacted, the release film is peeled, and an optical film instead of the release film is laminated to obtain an optical laminated film; and the like.

Here, the release film is the base material in forming the adhesive layer. When aging and preserving as the optical laminated film, the release film is used as the base material for protecting the adhesive layer from dust and the like.

As the release film, there are mentioned, for example, those obtained by using as a base material a film composed of various resins such as polyethylene terephthalate, polybutylene terephthalate, polycarbonate, polyallylate and the like, and performing releasing treatment (silicone treatment and the like) on a surface to be connected to an adhesive layer of this base material.

Here, the optical film is a film having an optical property, and examples thereof include a polarizing film, phase retardation film and the like.

The polarizing film is an optical film having a function of emitting polarization against incidence light such as natural light and the like.

Examples of the polarizing film include a straight line polarizing film absorbing straight line polarization on a vibration place parallel to an optical axis and allowing permeation of straight light polarization having a vibration plane which is a vertical plane, a polarizing separation film reflecting straight line polarization on a vibration plane parallel to an optical axis, an elliptic polarizing film obtained by laminating a polarizing film and a phase retardation film described later. As the specific examples of the polarizing film, those in which dichroic coloring matters such as iodine, dichroic dyes and the like are adsorbed and oriented in an uni-axially stretched polyvinyl alcohol film mono-axially stretched, and the like are listed.

The phase retardation film is an optical film having mono-axial or di-axial optical anisotropy, and listed are stretched films obtained by stretching at approximately 1.01 to 6-fold a polymer film composed of polyvinyl alcohol, polycarbonate, polyester, polyallylate, polyimide, polyolefin, polystyrene, polysulfone, polyether sulfone, polyvinylidene fluoride/polymethyl methacryalte, liquid crystal polyester, acetylcellulose, cyclic polyolefin, ethylene-vinyl acetate copolymer saponified material, polyvinyl chloride and the like. Among them, polymer films obtained by uni-axial or bi-axial stretching of polycarbonate or polyvinyl alcohol are preferably used.

Examples of the phase retardation film include a uni-axial phase retardation film, wide viewing angle phase retardation film, low photo-elastic phase retardation film, temperature-compensated phase retardation film, LC film (rod-like liquid crystal twisted orientation), WV film (disc-like liquid crystal inclined orientation), NH film (rod-like liquid crystal inclined orientation), VAC film (complete bi-axial orientation type phase retardation film), new VAC film (bi-axial orientation type phase retardation film) and the like.

On both surfaces or one surface of the above-mentioned optical film, a protective film may be further applied. Examples of the protective film include films composed of acrylic resins different from the acrylic resin of the present invention, acetylcellulose-based films such as a cellulose triacetate film and the like, polyester resin films, olefin resin films, polycarbonate resin films, polyether ketone resin films, polysulfone resin films and the like.

In the protective film, ultraviolet absorbers such as a salicylate-based compound, benzophenone-based compound, benzotriazole-based compound, triazine-based compound, cyanoacrylate-based compound, nickel complex salt-based compound and the like may be compounded. In the protective films, acetylcellulosed-based films are suitably used.

The optical laminate of the present invention is usually obtained by laminating a glass base plate on an adhesive layer of an optical laminated film.

Here, examples of the glass base plate include a glass base plate of liquid crystal cell, non-glaring glass, glass for sunglasses, and the like. Among them, an optical laminate obtained by laminating an optical laminated film (upper plate polarization plate) on a upper glass base plate of a liquid crystal cell, and laminating another optical laminated film (lower plate polarization plate) on a lower glass base plate of a liquid crystal cell is preferable since it can be used as a liquid crystal display. As the material of a glass base plate, for example, soda lime glass, low-alkali glass, non-alkali glass and the like are listed.

The acrylic resin composition of the present invention can be provided the optical laminated film used for a liquid crystal cell in which light leakage is suppressed and durability is excellent.

The acrylic resin composition of the present invention can be also provided the optical laminated film excellent in flexibility and showing excellent adhesion with an optical film and the like.

The composition containing the above-mentioned acrylic resin composition and cross-linking agent and/or silane compound can be suitably used as an adhesive.

An optical laminated film laminating an adhesive layer composed of the above-mentioned adhesive and an optical film can be laminated on a glass base plate of a liquid crystal cell to produce an optical laminate of the present invention.

In such an optical laminate, the adhesive layer absorbs and relaxes stress derived from the dimension change of the optical film and glass base plate under heat and humidity conditions, therefore, local stress concentration is decreased, and floating and peeling of the adhesive layer from the glass base plate is suppressed. Further, since optical defects caused by non-uniform stress distribution are prevented, when the glass base plate is a TN liquid crystal cell (TNT), light leakage is suppressed, and when the glass base plate is a STN liquid crystal cell, non-uniformity of color is suppressed. Furthermore, since a re-working property is excellent, even if an optical laminated film once laminated is peeled from the glass base plate of the optical laminate, paste remaining and fogging on the surface of the glass base plate after peeling are suppressed, and it can be again used as a glass base plate.

Even after peeling of an optical laminated film from the optical laminate of the present invention, fogging and paste remaining and the like scarcely occur on the surface of a glass base material in contact with an adhesive layer, consequently, it is easy to apply an optical laminated film again on the peeled glass base plate, therefore, a so-called re-working property is excellent.

The acrylic resin composition of the present invention can be used for, for example, an adhesive, paint, thickening agent and the like.

The adhesive of the present invention can be used, for example, as an adhesive suitable for an optical laminate of a liquid crystal cell and the like.

EXAMPLES

The present invention will be described further in detail based on examples, but it is needless to say that the scope of the invention is not limited to these examples at all.

In the examples, parts and % are by weight unless otherwise stated.

The content of non-volatile components was measured according to JIS K-5407. Specifically, an optional weight of adhesive solution was placed on a Petri dish, and dried in an explosion protection oven at 115° C. for 2 hours, then, the weight of remaining non-volatile components was divided by the weight of the originally weighed solution.

The viscosity is a value measured by a Brook field viscometer at 25° C.

Measurement of the weight-average molecular weight based on polystyrene calibration standard by GPC was conducted using a GPC apparatus equipped with a differential refractometer as a detector, under conditions of a sample concentration of 5 mg/ml, a sample introduction amount of 100 μl, a column temperature of 40° C. and a flow rate of 1 ml/min, and using tetrahydrofuran as an eluent.

Production Example of Acrylic Resin (1)

Polymerization Example 1-1

Into a reactor equipped with a cooling tube, nitrogen introduction tube, thermometer and stirrer was charged 184 parts of ethyl acetate, air in the apparatus was purged with a nitrogen gas to make no-oxygen atmosphere, then, the inner temperature was raised to 75° C. 0.50 parts of azobisisobutyronitrile (hereinafter, referred to as AIBN) was dissolved in 10.0 parts of ethyl acetate and the prepared solution was all added to the reactor, while keeping inner temperature at 74-76° C., then, a mixed solution of 60.0 parts of n-butyl acrylate, 9.5 parts of iso-butyl methacrylate and 5.8 parts of methyl acrylate as a monomer (a), and 7.4 parts of N-vinylpyrrolidone as a monomer (b) were dropped into the reaction system over 3 hours. Thereafter, the reaction was completed while the inner temperature is keeping at 74 to 76° C. for 5 hours. The content of non-volatile components in the resulted acrylic resin solution was regulated to 30%, to find a viscosity of 36 mPa·s. The weight-average molecular weight based on polystyrene calibration standard by GPC was approximately 126,000.

Polymerization Example 1-2

The reaction was completed in the same manner as in Polymerization Example 1-1 except that 172 parts of ethyl acetate, and 55.0 parts of n-butyl acrylate, 8.7 parts of iso-methbutyl acrylate and 5.3 parts of methyl acrylate as a monomer (a), 8.5 parts of vinyl caprolactam as a monomer (b), and 0.47 parts of AIBN were used. The content of non-volatile components in the resulted acrylic resin solution was regulated to 30%, to find a viscosity of 30 mPa·s. The weight-average molecular weight based on polystyrene calibration standard by GPC was approximately 88,300.

Polymerization Example 1-3

The reaction was completed in the same manner as in Polymerization Example 1-1 except that 172 parts of ethyl acetate, and 60.0 parts of n-butyl acrylate, 8.9 parts of isobutyl methacrylate and 5.4 parts of methyl acrylate as a monomer (a), 3.5 parts of N-vinylpyrrolidone as a monomer (b), and 0.47 parts of AIBN were used. The content of non-volatile components in the resulted acrylic resin solution was regulated to 30%, to find a viscosity of 23 mPa·s. The weight-average molecular weight based on polystyrene calibration standard by GPC was approximately 93,000.

Polymerization Example 1-4

The reaction was completed in the same manner as in Polymerization Example 1-1 except that 180 parts of ethyl acetate, and 55.0 parts of n-butyl acrylate, 9.4 parts of isobutyl methacrylate and 5.7 parts of methyl acrylate as a monomer (a), 11.0 parts of N-vinylpyrrolidone as a monomer (b), and 0.49 parts of AIBN were used. The content of non-volatile components in the resulted acrylic resin solution was regulated to 30%, to find a viscosity of 33 mPa·s. The weight-average molecular weight based on polystyrene calibration standard by GPC was approximately 96,900.

Polymerization Example 1-5

The reaction was completed in the same manner as in Polymerization Example 1-1 except that 183 parts of ethyl acetate, and 60.0 parts of n-butyl acrylate and 8.9 parts of n-butyl methacrylate as a monomer (a), 6.9 parts of N-vinylpyrrolidone as a monomer (b), 6.4 parts of isobornyl acrylate as a monomer (d), and 0.49 parts of AIBN were used. The content of non-volatile components in the resulted acrylic resin solution was regulated to 30%, to find a viscosity of 30 mPa·s. The weight-average molecular weight based on polystyrene calibration standard by GPC was approximately 84,800.

Polymerization Example 1-6

The reaction was completed in the same manner as in Polymerization Example 1-1 except that 159 parts of ethyl acetate, and 45.0 parts of n-butyl acrylate and 23.4 parts of n-butyl methacrylate as a monomer (a), 3.0 parts of N-vinylpyrrolidone as a monomer (b), 0.4 parts of acrylic acid as a monomer (c), and 0.43 parts of AIBN were used. The content of non-volatile components in the resulted acrylic resin solution was regulated to 30%, to find a viscosity of 42 mPa·s. The weight-average molecular weight based on polystyrene calibration standard by GPC was approximately 70,100.

Polymerization Example 1-7

The reaction was completed in the same manner as in Polymerization Example 1-1 except that 178 parts of ethyl acetate, and 40.0 parts of n-butyl acrylate, 26.6 parts of n-butyl methacrylate and 5.4 parts of methyl methacrylate as a monomer (a), 6.9 parts of N-vinylpyrrolidone as a monomer (b) and 1.58 parts of AIBN were used. The content of non-volatile components in the resulted acrylic resin solution was regulated to 30%, to find a viscosity of 16 mPa·s. The weight-average molecular weight based on polystyrene calibration standard by GPC was approximately 37,300.

Polymerization Example 1-8

The reaction was completed in the same manner as in Polymerization Example 1-7 except that 176 parts of ethyl acetate and 0.79 parts of AIBN were used. The content of non-volatile components in the resulted acrylic resin solution was regulated to 30%, to find a viscosity of 25 mPa·s. The weight-average molecular weight based on polystyrene calibration standard by GPC was approximately 66,900.

Polymerization Example 1-9

The reaction was completed in the same manner as in Polymerization Example 1-7 except that 175 parts of ethyl acetate and 0.47 parts of AIBN were used. The content of non-volatile components in the resulted acrylic resin solution was regulated to 30%, to find a viscosity of 31 mPa·s. The weight-average molecular weight based on polystyrene calibration standard by GPC was approximately 91,600.

Polymerization Example 1-10

The reaction was completed in the same manner as in Polymerization Example 1-1 except that 153 parts of ethyl acetate, and 55.0 parts of n-butyl acrylate, 36.6 parts of n-butyl methacrylate and 7.4 parts of methyl acrylate as a monomer (a), 9.5 parts of N-vinylpyrrolidone as a monomer (b) and 0.33 parts of AIBN were used. The content of non-volatile components in the resulted acrylic resin solution was regulated to 30%, to find a viscosity of 50 mPa·s. The weight-average molecular weight based on polystyrene calibration standard by GPC was approximately 178,000.

Polymerization Example 1-11

The reaction was completed in the same manner as in Polymerization Example 1-1 except that 128 parts of ethyl acetate, and 70.0 parts of n-butyl acrylate, 46.6 parts of n-butyl methacrylate and 9.4 parts of methyl methacrylate as a monomer (a), 12.1 parts of N-vinylpyrrolidone as a monomer (b) and 0.28 parts of AIBN were used. The content of non-volatile components in the resulted acrylic resin solution was regulated to 30%, to find a viscosity of 106 mPa·s. The weight-average molecular weight based on polystyrene calibration standard by GPC was approximately 251,000.

Polymerization Example 1-12

The reaction was completed in the same manner as in Polymerization Example 1-1 except that 95 parts of ethyl acetate, and 80.0 parts of n-butyl acrylate, 53.3 parts of n-butyl methacrylate and 10.8 parts of methyl acrylate as a monomer (a), 13.9 parts of N-vinylpyrrolidone as a monomer (b) and 0.16 parts of AIBN were used. The content of non-volatile components in the resulted acrylic resin solution was regulated to 30%, to find a viscosity of 310 mPa·s. The weight-average molecular weight based on polystyrene calibration standard by GPC was approximately 392,000.

Polymerization Example 1-13

The reaction was completed in the same manner as in Polymerization Example 1-1 except that 178 parts of ethyl acetate, and 80.0 parts of n-butyl acrylate as a monomer (a) and 0.48 parts of AIBN were used. The content of non-volatile components in the resulted acrylic resin solution was regulated to 30%, to find a viscosity of 27 mPa·s. The weight-average molecular weight based on polystyrene calibration standard by GPC was approximately 78,600.

Polymerization Example 1-14

The reaction was completed in the same manner as in Polymerization Example 1-1 except that 162 parts of ethyl acetate, and 60.0 parts of n-butyl acrylate, 8.3 parts of iso-butyl methacrylate and 5.0 parts of methyl acrylate as a monomer (a) and 0.44 parts of AIBN were used. The content of non-volatile components in the resulted acrylic resin solution was regulated to 30%, to find a viscosity of 25 mPa·s. The weight-average molecular weight based on polystyrene calibration standard by GPC was approximately 75,500.

Polymerization Example 1-15

The reaction was completed in the same manner as in Polymerization Example 1-1 except that 179 parts of ethyl acetate, and 80.0 parts of n-butyl acrylate as a monomer (a), 0.45 parts of acrylic acid as a monomer (c), and 0.48 parts of AIBN were used. The content of non-volatile components in the resulted acrylic resin solution was regulated to 30%, to find a viscosity of 20 mPa·s. The weight-average molecular weight based on polystyrene calibration standard by GPC was approximately 82,400.

Production Example of Acrylic Resin (2)

Polymerization Example 2-1

Into the same reactor as in Polymerization Example 1-1 was charged 206 parts of acetone, and 210 parts of butyl acrylate as a monomer (a) and 1.2 parts of acrylic acid as a monomer (c), air in the apparatus was purged with a nitrogen gas to make no-oxygen atmosphere, then, the inner temperature was raised to 55° C. 0.148 parts of 2,2'-azobis(2,4-dimethylvaleronitrile) as an initiator was dissolved in 5 parts of acetone and the prepared solution was all added to the reactor. In this point, the concentration of monomers was 50%. After adding the initiator, the inner temperature was raised at up to approximately 70° C. for 30 minutes and lowered at 55° C. during 30 minutes. Then, while keeping the inner temperature at 54 to 56° C., acetone was added over 8 hours so that the total concentration of the charged monomers was 35%. After completion of adding, while keeping the inner temperature at 54 to 56° C. for further 3 hours to complete the reaction, the monomer concentration was adjusted to 20%. The content of non-volatile components in the resulted acrylic resin solution 19.9%, and the viscosity was 1950 mPa·s. The weight-average molecular weight based on polystyrene calibration standard by GPC was approximately 780,000.

Polymerization Example 2-2

The reaction was completed in the same manner as in Polymerization Example 2-1 except that 168 parts of acetone and 0.085 part of 2,2'-azobis(2,4-dimethylvaleronitrile) were used. The content of non-volatile components in the resulted acrylic resin solution was 19.6%, to find a viscosity of 6450 mPa·s. The weight-average molecular weight based on polystyrene calibration standard by GPC was approximately 1,040,000.

Polymerization Example 2-3

The reaction was completed in the same manner as in Polymerization Example 2-2 except that the inner temperature was keeping at 50° C. The content of non-volatile components in the resulted acrylic resin solution was 18.8%, to find a viscosity of 4400 mPa·s. The weight-average molecular weight based on polystyrene calibration standard by GPC was approximately 1,150,000.

Polymerization Example 2-4

The reaction was completed in the same manner as in Polymerization Example 2-1 except that 0.042 part of 2,2'-azobis (2,4-dimethylvaleronitrile) was used. The content of non-volatile components in the resulted acrylic resin solution was 20.1%, to find a viscosity of 14300 mPa·s. The weight-average molecular weight based on polystyrene calibration standard by GPC was approximately 1,380,000.

Polymerization Example 2-5

The reaction was completed in the same manner as in Polymerization Example 2-1 except that 0.031 part of 2,2'-azobis (2,4-dimethylvaleronitrile) was used. The content of non-volatile components in the resulted acrylic resin solution was 19.3%, to find a viscosity of 9900 mPa·s. The weight-average molecular weight based on polystyrene calibration standard by GPC was approximately 1,450,000.

Polymerization Example 2-6

The reaction was completed in the same manner as in Polymerization Example 2-1 except that 0.021 part of 2,2'-azobis (2,4-dimethylvaleronitrile) was used. The content of non-volatile components in the resulted acrylic resin solution was 19.7%, to find a viscosity of 18400 mPa·s. The weight-average molecular weight based on polystyrene calibration standard by GPC was approximately 1,570,000.

Polymerization Example 2-7

The reaction was completed in the same manner as in Polymerization Example 2-3 except that 176 parts of acetone, and 9.7 parts of vinylpyrrolidone as a monomer (b), 1.3 parts of acrylic acid as a monomer (c), and 0.022 part of 2,2'-azobis (2,4-dimethylvaleronitrile) were used. The content of non-volatile components in the resulted acrylic resin solution was 19.4%, to find a viscosity of 1280 mPa·s. The weight-average molecular weight based on polystyrene calibration standard by GPC was approximately 600,000.

Acrylic Resin Composition and Production Example of Adhesive Containing the Same Composition Example 1

The acrylic resin solution obtained in Polymerization Example 1-1 was used as a solution of an acrylic resin (1), the acrylic resin solution obtained in Polymerization Example 2-3 was used as a solution of an acrylic resin (2), and they were mixed so that the content of non-volatile components in the acrylic resin (1) was 70 parts and the content of non-volatile components in the acrylic resin (2) was 30 parts, to obtain an ethyl acetate solution of acrylic resin composition having a non-volatile component content of 20.0%. To 100 parts of non-volatile components in the resulted solution was mixed 1.0 part of non-volatile components of a polyisocyanate-based compound (trade name: Takenate D-160N, manufactured by Mitsui-Takeda Chemical Inc.) and 0.4 part of a silane-based compound (trade name: KBM-403, manufactured by Shin-Etsu Silicones) as a cross-linking agent, to obtain an adhesive of the present invention.

Production Examples of Optical Laminated Film, and Optical Laminate

Thus obtained adhesive was applied, using an applicator, on a releasing-treated surface of a polyethylene terephthalate film (manufactured by LINTEC Corporation, trade name: PET 3811) which had been subjected to releasing treatment so that the thickness after drying was 25 μm, the dried at 90° C. for 1 minute, to obtain an adhesive in the form of sheet. Then, a polarizing film (film having a three-layer structure obtained by adsorbing iodine into polyvinyl alcohol and stretching to obtain a stretched film and sandwiching said stretched film on both surfaces thereof by triacetylcellulose-based protective films) was used as an optical film, and a surface having the adhesive obtained above was applied on this optical film by a laminator, then, aged under a temperature of 23° C. and a humidity of 65% for 7 days, to obtain an optical laminated film having an adhesive layer. Subsequently, this optical laminated film was adhered on both surfaces of a glass base plate for liquid crystal cell (manufactured by Corning, 1737) so as to give Cross Nicol condition. This was preserved under 80° C. and dry condition for 96 hours (condition 1) and durability and light leakage of the optical laminate after preservation were observed visually. This was also preserved under 60° C. and 90% RH for 96 hours (condition 2) and durability of the optical laminate was observed visually. The results are classified as described below and shown in Table 1.

<Light Leakage Property of Optical Laminate>

Evaluation of state of generation of light leakage was conducted according to the following four stages.
◎: no light leakage
○: little light leakage
Δ: slight light leakage
X: remarkable light leakage <Durability of Optical Laminate>

Evaluation of durability was conducted according to the following four stages.
◎: no change in appearance such as floating, peeling, foaming and the like
○: little change in appearance such as floating, peeling, foaming and the like
Δ: slight change in appearance such as floating, peeling, foaming and the like
X: remarkable change in appearance such as floating, peeling, foaming and the like <Re-working Property>

Evaluation of the re-working property was conducted as described below. First, the above-mentioned optical laminate was processed into a specimen of 25 mm×150 mm. Then, this specimen was pasted on a glass base plate for liquid crystal cell (manufactured by Corning, 1737) using a pasting apparatus ("Lamipacker", manufactured by Fuji Plastic Machine K.K.), and treated in an autoclave under 50° C., 5 kg/cm$^2$ (490.3 kPa) for 20 minutes, subsequently, heated in an oven under 70° C. for 2 hours, preserved in an oven under 70° C. for 24 hours. The optical laminate for peeling test was peeled toward 180 direction at a rate of 300 mm/min in an atmosphere of 23° C. and 50% RH, and the state of the surface of the glass plate classified according to the following conditions was observed and shown in Table 1-3.

Evaluation of the re-working property was conducted by observing the state of the surface of the glass plate according to the following four stages.
◎: no fogging and past remaining on the surface of glass plate
○: little fogging and the like on the surface of glass plate
Δ: fogging and the like on the surface of glass plate
X: paste remaining on the surface of glass plate Examples 2 to 14 and Comparative Examples 1 to 7

An acrylic resin composition, adhesive, optical laminated film and optical laminate were produced according to Example 1 using the acrylic resins (1) and (2) at weight ratios shown in Tables 1-3. Evaluation of the resulted optical laminate was conducted in the same manner as in Example 1, and the results are shown in Tables 1-3 together with that of Example 1.

TABLE 1

| | | Example | | | | | | |
|---|---|---|---|---|---|---|---|---|
| | | 1 | 2 | 3 | 4 | 5 | 6 | 7 |
| Acrylic resin (1) | Polymerization example | 1-1 | 1-2 | 1-3 | 1-4 | 1-5 | 1-6 | 1-7 |
| | Non-volatile component content (part by weight) | 30 | 30 | 30 | 30 | 30 | 30 | 30 |
| | (a)*[1] (part by weight) | 91.0 | 89.0 | 95.5 | 86.4 | 83.8 | 95.2 | 91.2 |
| | (b)*[1] (part by weight) | 9.0 | 11.0 | 4.5 | 13.6 | 8.4 | 4.2 | 8.8 |
| | (c)*[1] (part by weight) | 0 | 0 | 0 | 0 | 0 | 0.6 | 0 |
| | (d)*[1] (part by weight) | 0 | 0 | 0 | 0 | 7.8 | 0 | 0 |
| | Molecular weight (×10$^3$) | 126 | 88.3 | 93 | 96.9 | 84.8 | 70.1 | 37.3 |
| Acrylic resin (2)*[3] | Polymerization example | 2-3 | 2-3 | 2-3 | 2-3 | 2-3 | 2-3 | 2-3 |
| | Non-volatile component content (part by weight) | 70 | 70 | 70 | 70 | 70 | 70 | 70 |
| | (a)*[2] (part by weight) | 99.4 | 99.4 | 99.4 | 99.4 | 99.4 | 99.4 | 99.4 |
| | (b)*[1] (part by weight) | 0 | 0 | 0 | 0 | 0 | 0 | 0 |
| | (c)*[1] (part by weight) | 0.6 | 0.6 | 0.6 | 0.6 | 0.6 | 0.6 | 0.6 |

TABLE 1-continued

|  |  | Example |  |  |  |  |  |  |
|---|---|---|---|---|---|---|---|---|
|  |  | 1 | 2 | 3 | 4 | 5 | 6 | 7 |
|  | Molecular weight (×10$^6$) | 1.15 | 1.15 | 1.15 | 1.15 | 1.15 | 1.15 | 1.15 |
| Condition 1 | Durability | ◎ | ◎ | ◎ | ◎ | ◎ | ◎ | ◎ |
|  | Light leakage property | ◎ | ◎ | ○ | ◎ | ◎ | ○ | ◎ |
| Condition 2 | Durability | ○ | ○ | ◎ | ○ | ○ | ◎ | ○ |
| reworking property | Paste remaining property | ○ | ○ | ◎ | ○ | ○ | ◎ | ○ |

*$^1$Parts by weight of structural units (a) + (b) + (c) + (d) = 100 (parts by weight)

TABLE 2

|  |  | Example |  |  |  |  |  |  |
|---|---|---|---|---|---|---|---|---|
|  |  | 8 | 9 | 10 | 11 | 12 | 13 | 14 |
| Acrylic resin (1) | Polymerization example | 1-8 | 1-9 | 1-10 | 1-11 | 1-12 | 1-8 | 1-8 |
|  | Non-volatile component content (part by weight) | 30 | 30 | 30 | 30 | 30 | 30 | 30 |
|  | (a)*$^1$ (part by weight) | 91.2 | 91.2 | 91.2 | 91.2 | 91.2 | 91.2 | 91.2 |
|  | (b)*$^1$ (part by weight) | 8.8 | 8.8 | 8.8 | 8.8 | 8.8 | 8.8 | 8.8 |
|  | (c)*$^1$ (part by weight) | 0 | 0 | 0 | 0 | 0 | 0 | 0 |
|  | (d)*$^1$ (part by weight) | 0 | 0 | 0 | 0 | 0 | 0 | 0 |
|  | Molecular weight (×10$^3$) | 66.9 | 91.6 | 17.8 | 251 | 392 | 66.9 | 66.9 |
| Acrylic resin (2)*$^3$ | Polymerization example | 2-3 | 2-3 | 2-3 | 2-3 | 2-3 | 2-4 | 2-5 |
|  | Non-volatile component content (part by weight) | 70 | 70 | 70 | 70 | 70 | 70 | 70 |
|  | (a)*$^2$ (part by weight) | 99.4 | 99.4 | 99.4 | 99.4 | 99.4 | 99.4 | 99.4 |
|  | (b)*$^1$ (part by weight) | 0 | 0 | 0 | 0 | 0 | 0 | 0 |
|  | (c)*$^1$ (part by weight) | 0.6 | 0.6 | 0.6 | 0.6 | 0.6 | 0.6 | 0.6 |
|  | Molecular weight (×10$^6$) | 1.15 | 1.15 | 1.15 | 1.15 | 1.15 | 1.38 | 1.45 |
| Condition 1 | Durability | ◎ | ◎ | ◎ | ◎ | ◎ | ◎ | ◎ |
|  | Light leakage property | ◎ | ◎ | ◎ | ◎ | ◎ | ○ | ○ |
| Condition 2 | Durability | ◎ | ◎ | ◎ | ◎ | ◎ | ◎ | ◎ |
| reworking property | Paste remaining property | ○ | ○ | ○ | ○ | ◎ | ◎ | ◎ |

*$^1$Parts by weight of structural units (a) + (b) + (c) + (d) = 100 (parts by weight)

TABLE 3

|  |  | Comparative Example |  |  |  |  |  |  |
|---|---|---|---|---|---|---|---|---|
|  |  | 1 | 2 | 3 | 4 | 5 | 6 | 7 |
| Acrylic resin (1) | Polymerization example | 1-13 | 1-14 | 1-15 | 1-8 | 1-8 | 1-8 | — |
|  | Non-volatile component content (part by weight) | 30 | 30 | 30 | 30 | 30 | 30 | — |
|  | (a)*$^1$ (part by weight) | 100 | 100 | 99.4 | 91.2 | 91.2 | 91.2 | — |
|  | (b)*$^1$ (part by weight) | 0 | 0 | 0 | 8.8 | 8.8 | 8.8 | — |
|  | (c)*$^1$ (part by weight) | 0 | 0 | 0.6 | 0 | 0 | 0.6 | — |
|  | (d)*$^1$ (part by weight) | 0 | 0 | 0 | 0 | 0 | 0 | — |
|  | Molecular weight (×10$^3$) | 78.6 | 75.5 | 82.4 | 66.9 | 66.9 | 66.9 | — |
| Acrylic resin (2)*$^3$ | Polymerization example | 2-3 | 2-3 | 2-3 | 2-1 | 2-2 | 2-6 | 2-7 |
|  | Non-volatile component content (part by weight) | 70 | 70 | 70 | 70 | 70 | 70 | 70 |

TABLE 3-continued

|  |  | Comparative Example | | | | | | |
|---|---|---|---|---|---|---|---|---|
|  |  | 1 | 2 | 3 | 4 | 5 | 6 | 7 |
|  | (a)*2 (part by weight) | 99.4 | 99.4 | 99.4 | 99.4 | 99.4 | 99.4 | 95 |
|  | (b)*1 (part by weight) | 0 | 0 | 0 | 0 | 0 | 0 | 4.4 |
|  | (c)*1 (part by weight) | 0.6 | 0.6 | 0.6 | 0.6 | 0.6 | 0.6 | 0.6 |
|  | Molecular weight (×10$^6$) | 1.15 | 1.15 | 1.15 | 0.78 | 1.04 | 1.57 | 0.6 |
| Condition 1 | Durability | ◎ | ◎ | ◎ | X | ○ | ◎ | X |
|  | Light leakage property | X | X | X | ◎ | ◎ | Δ | ○ |
| Condition 2 | Durability | ◎ | ○ | ◎ | X | X | ◎ | X |
| reworking property | Paste remaining property | ○ | ○ | ○ | X | X | Δ | X |

*1 Parts by weight of structural units (a) + (b) + (c) + (d) = 100 (parts by weight)

What is claimed is:

1. An optical laminated film laminating an adhesive layer containing an adhesive on both surfaces or one surface of an optical film that is a polarizing film and/or phase retardation film;
   wherein the adhesive comprises an acrylic resin composition and a cross-linking agent and/or silane-based compound;
   wherein said acrylic resin composition comprises the following acrylic resins (1) and (2):
   acrylic resin (1): an acrylic resin containing a structural unit derived from a monomer (a) (structural unit (a)) and a structural unit derived from a monomer (b) (structural unit (b)):
   acrylic resin (2): an acrylic resin having a molecular weight of 1,100,000 to 1,500,000, and containing the structural unit (a) as the main component and a structural unit derived from a monomer (c) (structural unit (c)) and substantially not containing the structural unit (b);
   (a): a (meth)acrylate of the formula (A)

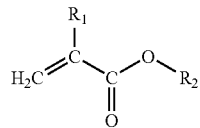

(A)

(wherein, $R_1$ represents a hydrogen atom or methyl group, $R_2$ represents an alkyl group having 1 to 14 carbon atoms or an aralkyl group having 1 to 14 carbon atoms, and a hydrogen atom in the alkyl group $R_2$ or a hydrogen atom in the aralkyl group $R_2$ may be substituted with an alkoxy group having 1 to 10 carbon atoms),
   (b): a monomer containing an olefinic double bond in the molecule and at least one 5- or more-membered heterocyclic group in the molecule,
   (c): a monomer not containing 5- or more-membered heterocyclic group and containing one olefinic double bond and at least one polar functional group selected from the group consisting of a carboxyl group, hydroxyl group, amide group, amino group, epoxy group, oxetanyl group, aldehyde group and isocyanate group in the molecule.

2. The optical laminated film according to claim 1, wherein the optical film is an optical film further having an acetylcellulose-based film as a release film.

3. The optical laminated film according to claim 1, wherein a release film is further laminated on the adhesive layer of the optical laminated film.

4. An optical laminate obtained by laminating a glass base material on the adhesive layer of the optical laminated film according to claim 1 or 2.

5. An optical laminate obtained by peeling the release film from the optical laminated film according to claim 3, then, laminating a glass base material on the adhesive layer of the optical laminated film.

6. An optical laminate obtained by peeling the optical laminated film from the optical laminate according to claim 4, then, laminating again the optical laminated film on the resulted glass base material.

* * * * *